(No Model.)
M. SAFFORD.
FRICTION SUPPORTING DEVICE FOR MIRRORS, TRANSOMS, &c.
No. 278,364.                               Patented May 29, 1883.
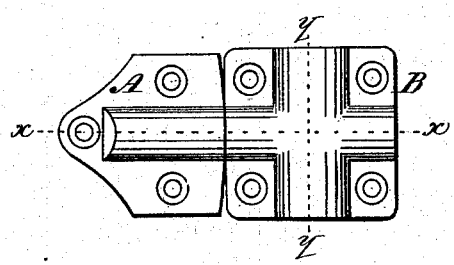
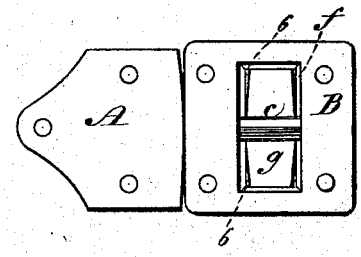
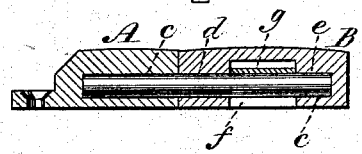
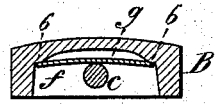
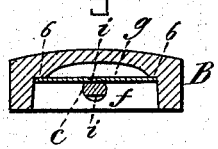
WITNESSES
W. J. Cambridge
E. S. Hansen
INVENTOR
Mark Safford
per T. E. Teschemacher
Atty

UNITED STATES PATENT OFFICE.

MARK SAFFORD, OF BOSTON, ASSIGNOR TO HIMSELF AND FRANCIS S. FROST, OF ARLINGTON, MASSACHUSETTS.

FRICTION SUPPORTING DEVICE FOR MIRRORS, TRANSOMS, &c.

SPECIFICATION forming part of Letters Patent No. 278,364, dated May 29, 1883.

Application filed March 10, 1883. (No model.)

*To all whom it may concern:*

Be it known that I, MARK SAFFORD, a citizen of the United States, residing at Boston, in the county of Suffolk and State of Massachusetts, have invented certain Improvements in Friction Supporting Devices for Mirrors, Transoms, &c., of which the following is a full, clear, and exact description, reference being had to the accompanying drawings, making part of this specification, in which—

Figure 1 is a plan of the outer side of my improved hinge. Fig. 2 is a plan of the inner side of the same. Fig. 3 is a section on the line $xx$ of Fig. 1. Fig. 4 is a section on the line $yy$ of Fig. 1. Fig. 5 is a section through a similar hinge, having a portion of its pintle flattened upon two sides.

My invention relates to certain improvements in friction supporting devices, especially designed for supporting or hanging bureau-mirrors, transom-windows, &c., where it is desirable to hold the frame or article supported in such a manner as to prevent it from swinging too freely on its pivots; and my invention consists in a friction supporting device for mirrors, transoms, &c., composed of a leaf provided with a recess having supported within it, at its opposite ends, a flat spring, with a space between the latter and the bottom of the recess, in combination with a second leaf having immovably secured thereto a pintle passing through the recess in the first leaf in contact with said spring, as hereinafter set forth.

In the said drawings, A B represent the two leaves of my improved friction supporting device, which may be of any desired or suitable shape to adapt them for the purpose for which they are to be used. These leaves A B are connected together by a pintle, $c$, one end of which is cast within or otherwise immovably secured to the leaf A, the other end fitting snugly within bearings or apertures $d\ e$ in the other leaf, B, as seen in Fig. 3. Within the leaf B, on the inner side thereof, is formed a rectangular recess or cavity, $f$, through which passes the pintle $c$, beneath which is placed a stiff flat steel spring, $g$, the opposite ends of which rest upon shoulders 6 at the ends of the recess $f$, by which means the spring is kept out of contact with the bottom thereof, as is necessary to render it operative. When the several parts of the device are put together this spring $g$ is caused to bear at or near its center firmly against the pintle $c$ and produce a sufficient amount of friction thereon to prevent the swinging frame or other article supported by the friction supporting device from moving too freely on its pivots, and thereby cause it to be securely held at any desired angle, thus adapting the hinge particularly for use in hanging swinging mirrors to furniture, and for transom-windows, swinging screens, and a variety of other purposes where a frictional hinge or pivotal supporting device is required.

It will be seen that as the pintle becomes worn the spring $g$ will still continue to bear thereon and maintain the desired degree of friction, thus insuring durability and causing the device to remain at all times in an operative condition.

In Fig. 5 is represented a friction supporting device having the same construction and mode of operation as that above described, but in which that portion of the pintle $c$ within the recess $f$ is provided on two of its opposite sides with flat faces $i$, against either of which the spring may bear to hold the leaf B in a predetermined position with relation to the leaf A; and it is evident that the pintle may be provided with one flat face only, or with a series of two or more, so placed as to cause the swinging frame or other article supported by the friction supporting device to be steadily held thereby at any predetermined angle or angles, as may be required.

I am aware of Patents No. 225,761, of March 23, 1880, No. 165,469, of July 13, 1875, and No. 251,351, of December 27, 1881, in which a friction or brake spring is employed which acts upon a shaft or bolt and serves to hold the moving parts in any desired position. I therefore lay no broad claim to such a device, nor to any of the devices or details of construction shown in said patents.

What I claim as my invention, and desire to secure by Letters Patent, is—

The within-described friction supporting device for mirrors, transoms, &c., consisting of the leaf B, with its recess $f$, having supported within it, at its opposite ends, a flat spring, $g$, with a space between the latter and the bottom of the recess, in combination with the leaf A, having immovably secured thereto the pintle $c$, passing through the recess $f$ of the leaf B, in contact with the spring $g$, all constructed and arranged to operate substantially in the manner and for the purpose set forth.

Witness my hand this 6th day of March, A. D. 1883.

MARK SAFFORD.

In presence of—
P. E. TESCHEMACHER,
W. J. CAMBRIDGE.